United States Patent [19]

Kowalski

[11] 4,011,892

[45] * Mar. 15, 1977

[54] THREE PORT NON-INTERFLOW POPPET VALVE

[75] Inventor: Slawomir Kowalski, Rockaway, N.J.

[73] Assignee: Marotta Scientific Controls, Inc., Boonton, N.J.

[ * ] Notice: The portion of the term of this patent subsequent to Nov. 25, 1992, has been disclaimed.

[22] Filed: Mar. 14, 1975

[21] Appl. No.: 558,370

[52] U.S. Cl. ............... 137/625.66; 137/625.27; 137/625.64; 251/63.5

[51] Int. Cl.² ........................... F15B 13/043

[58] Field of Search ........ 137/625.27, 625.5, 625.6, 137/625.64, 625.66, 236; 251/63, 63.5, 63.6, 62

[56] References Cited

UNITED STATES PATENTS

| | | | |
|---|---|---|---|
| 1,167,027 | 1/1916 | Stephenson | 137/625.26 |
| 2,913,005 | 11/1959 | Grant et al. | 137/625.6 |
| 3,379,405 | 4/1968 | Natho | 251/63.6 X |
| 3,460,614 | 8/1969 | Burgess | 137/596 X |
| 3,618,690 | 11/1971 | Johnson | 251/DIG. 1 |
| 3,771,564 | 11/1973 | Bianchetta et al. | 137/625.63 |

FOREIGN PATENTS OR APPLICATIONS

| | | | |
|---|---|---|---|
| 1,114,731 | 10/1961 | Germany | 251/63.6 |
| 1,214,713 | 12/1970 | United Kingdom | 137/625.6 |

*Primary Examiner*—Alan Cohan
*Assistant Examiner*—Gerald A. Michalsky
*Attorney, Agent, or Firm*—Roy C. Hopgood; John M. Calimafde

[57] ABSTRACT

The valve element of this invention is generally cylindrical and has poppet valves at both ends for contact with seats at opposite ends of a chamber in which the valve element moves. Cylindrical side walls at each end of the chamber prevent interflow between ports during movement of the valve element from one end of its stroke to the other. For sub-sea use on offshore drilling well heads, a spring that moves the valve element in one direction is in a chamber sealed from an adjacent chamber to which the ambient sea water has access. Apparatus for pilot operation of the valve element has spaced, aligned bearing guides for guiding the valve element on opposite sides of an intervening chamber that holds the sea water.

5 Claims, 4 Drawing Figures

THREE PORT NON-INTERFLOW POPPET VALVE

RELATED INVENTIONS

The valve described in this specification is a modification of that disclosed in my co-pending application Ser. No. 497,759, filed Aug. 15, 1974, now U.S. Pat. No. 3,921,660.

BACKGROUND AND SUMMARY OF THE INVENTION

This valve for controlling the flow of high pressure working fluid is suitable for use on well heads used in offshore oil drilling installations and other uses. The valve has an actuator which is preferably a cylinder-and-piston motor and it has a spring for moving the valve element in one direction, the cylinder-and-piston motor serving to move the valve element in the other direction.

There is an intermediate chamber, to which sea water has access, between the actuator and the valve chamber. Although the spring can be made of stainless steel, such material after being tempered to form a spring is subject to deterioration when exposed to sea water. It is a feature of the present invention that the sea water chamber is sealed off from the space that houses the spring. This space is preferably at the same pressure as that used to operate the cylinderand-piston motor, and in the preferred construction, a pilot valve that supplies working fluid to the cylinder and piston motor is operated with its minimum pressure at least as high as the pressure in the sea water chamber so that if any leakage occurs at the seal, the leakage will be toward the sea water chamber.

Another feature of the invention is that the piston which operates the valve element, has a piston rod which extends from the actuator through the sea water chamber to the valve chamber; and the piston and piston rod assembly which is a rigid unitary structure, is guided in spaced-apart guide bearings at opposite sides of the sea water chamber.

A shoulder, which is a rigid part of the piston structure, is used to compress the spring against a fixed part of the housing.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figures 1, 2, 3, 4:
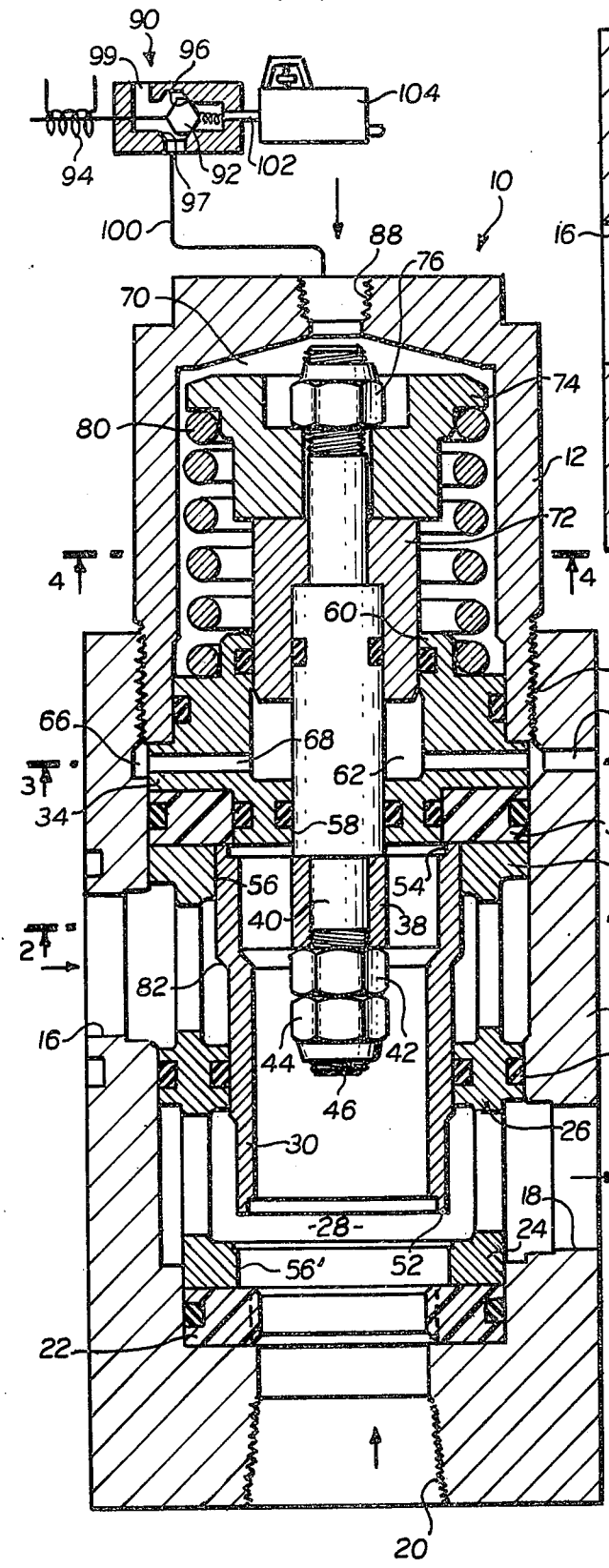
FIG. 1 is a sectional view, partly diagrammatic, showing the valve structure of this invention and the pilot valve for controlling the operation.
FIGS. 2, 3 and 4 are sectional views taken on the lines 2—2, 3—3, and 4—4 of FIG. 1.

FIG. 1 shows a valve housing 10 which is preferably located on the well head at the bottom of the sea where drilling is to take place. The housing 10 includes a lower body portion 11 which is rigidly connected with a pod of the well head; and an upper body portion 12 which screws into the upper end of the lower body portion 11 along screw threads 14. The working fluid, which is to be controlled by the valve, enters the lower body portion 11 through an inlet port 16 and the working fluid is exhausted from the lower body portion 11 through an exhaust port 18.

The valve controls the flow of working fluid to and from a port 20 in the lower end of the valve housing 10; and this port 20 will be referred to as the cylinder port. The interior of the lower portion 11 is of generally cylindrical cross section, but the diameter of the cross section is not the same at all locations.

There is a valve seat 22 at the lowermost location within the interior of the lower portion of the valve housing 10. This valve seat is preferably made of plastic. A cage 24 is located immediately above the valve seat 22. This cage is of the same diameter as the adjacent portions of the interior of the valve housing at the upper and lower ends of the cage 24 and at an intermediate part of the cage it forms an annular partition 26.

The interior of the cage 24 provides a valve chamber 28 in which a valve element 30 has reciprocating movement.

At the upper end of the cage 24 there is another valve seat 32 which is preferably made of plastic.

An upper wall 34 closes the upper end of the valve chamber 28 and this upper wall is clamped, by the upper body portion 12, against the upper valve seat 32, and clamps the upper valve seat 32, cage 24, and lower valve seat 22 firmly together in a unitary assembly which is in turn clamped against the lower end of the interior of the lower body portion 11. The parts within the valve housing, and thus far described, have seals, such as O-rings 36, at appropriate locations as shown in FIG. 1.

The valve element 30 has a center hub 38 through which a piston rod 40 extends. A shoulder on the piston rod 40 contacts with the upper end of the center hub 38 and the piston rod is firmly secured to the hub 38 by a nut 42 and lock nut 44 screwed over a lower threaded end 46 of the piston rod.

FIG. 2 is a sectional view taken on the line 2—2 of FIG. 1 and shows the valve element 30 with the center hub 38 connected to the side walls of the valve by webs 48 so as to leave openings 50 which constitute part of the hollow interior of the valve element 30 extending from one end of the valve element to the other so that working fluid can flow through the valve element 30.

The lower end of the valve element 30 has a bottom surface which forms a poppet valve 52 that seats against the valve seat 22. At the upper end of the valve element 32, there is a similar poppet valve 54 which seats against the valve seat 32. In FIG. 1 the poppet valve 54 is shown in closed position and the poppet valve 52 is shown in open position.

With the valve element 30 in the position shown in FIG. 1, working fluid from the cylinder port 20 is free to flow through the space between the valve seat 22 and the poppet valve 52 into the exhaust valve port 18. The poppet valve 54, closed against the upper seat 32, prevents any working fluid from flowing from the inlet port 16.

When the valve element 32 starts to move downwardly, under the influence of an actuator which will be described later, the poppet valve 54 moves away from the seat 32 and the poppet valve 52 moves toward its seat 22. During the initial part of such movement, the upper end of the valve element 30 is moving in a cylindrical portion of the cage 24 which fits closely around the valve element 30 so that even though the poppet valve 54 has moved away from the seat 32, the working fluid from the inlet port 16 cannot reach the upper end of the valve element 30; and can gain access to the upper end of the valve element 30 only to a very limited extent resulting from leakage of the working fluid through the running clearance between the upper end of the valve element 30 and the wall of the cage 24 which confronts the valve element. This confronting surface of the cage 24 is designated in FIG. 1 by the reference character 56.

There is a similar wall 56' forming a cylinder into which the lower end of the valve element 30 moves when the valve element 30 is approximately half-way between the valve seats 22 and 32. By the time the valve element 30 has moved down far enough for the poppet valve 54 to clear the upper cylindrical wall 56, the lower poppet valve 52 moves to the upper end of the cylindrical wall 56'. As soon as the valve element 30 is in position where working fluid from the inlet port 16 can flow freely over the poppet valve 56 and into the interior of the valve element 30, the poppet valve 52 has reached the cylindrical wall 56' and shut off free flow to the exhaust port 18. Fluid from the inlet port 16 flows through the valve element 30 and into the cylinder port 20. The entrance of the poppet valve 52 into the cylinder formed by the wall 56' prevents any substantial inflow to the exhaust port 18 while the poppet valve 52 is moving into contact with its seat 22 so as to completely shut off any flow to the exhaust port 18.

The upper wall 34 has two aligned, cylindrical guide bearings 58 and 60. Between these two guide bearings 58 and 60 there is a chamber 62 into which sea water has access through a port 64 in the valve housing 11 and around a circumferential groove 66 in the wall of the body portion 11 to radial ports 68 opening into the chamber 62 as shown in FIG. 3.

A chamber 70 enclosed by the upper body portion 12 above the wall 34 encloses a piston 72 which slides up and down in a cylinder comprising the guide bearing 60. The chamber 70 also encloses a shoulder fitting 74 which is clamped against the upper end of the piston 72 by a nut 76 that screws over an upper end of the piston rod 40. This shoulder fitting 74, the piston 72, the piston rod 40 and valve element 30 comprise a unitary construction that reciprocates in the guide bearings 60 and 58 which are spaced some distance apart lengthwise of the piston rod so as to hold the piston rod and its connected parts to straight line movement without any risk of cocking of the piston and piston rod unit in the guide bearings 58 and 60 and resulting excessive wear or galling.

The shoulder fitting 74 clamps a spring 80 against the wall 34 at the lower end of the chamber 70. The compression of this spring 80 urges the shoulder fitting 74 and the parts that are connected with it upwardly into the position shown in FIG. 1. Thus the spring 80 holds the valve element 30 with its poppet valve 84 firmly in contact with the seat 32.

In order to provide additional force for holding the poppet valve 54 closed, the valve element 30 has a shoulder 82 around its outer periphery and the valve element 30 above the shoulder 82 has its outside diameter larger than at the portion of the valve 30 which slides in the opening through the annular partition 26. Thus the pressure from the inlet port 16 exerts an upward thrust against the valve element 30 to hold it in closed position against the seat 32.

When the valve element 30 is to be moved downwardly to close the poppet valve 52 against the seat 22, pressure is supplied to the chamber 70 through an inlet port 88 communicating with a pilot valve 90. This rise in pressure in the chamber 70 forces the piston 72 downwardly against the sea water pressure in the chamber 62 and moves the valve 30 into position to bring the poppet valve 52 into contact with the seat 22 to change the flow of working fluid as has previously been described.

The pilot valve 90 is shown diagrammatically and it includes a poppet valve 92 which is moved longitudinally, by a solenoid 94, between opposing valve seats 96 and 97. When the valve element 92 is in the position shown in FIG. 1, working fluid enters the housing of the pilot valve through an inlet port 99 and flows past the valve element 92 and through an outlet port and hose or tubing 100 to the inlet port 88 at the upper end of the valve housing 10. The inlet port 99 is connected with a source of working fluid under pressure high enough to operate the piston 72 in the valve housing 10.

When the pressure in the chamber 70 is to be released, so that the spring 80 can move the valve element 30 into the position shown in FIG. 1, the pilot valve element 92 is moved against the left hand seat 97. This permits working fluid from the housing 10 to flow upwardly through the hose or tubing 100 and out of the pilot valve through an exhaust passage 102. In the preferred construction, the exhaust passage 102 has a regulator 104 in series with it. This regulator is adjusted to maintain the back pressure on the chamber 70 at least as high and preferably somewhat higher than the sea water pressure in the chamber 62.

As long as the pressure in the chamber 70 is at least as great as that in the chamber 62, any leakage that occurs past the seal in the guide bearing 60, and a corresponding seal around the piston rod 40, will be in a direction toward the sea water chamber and there is no danger of sea water entering the chamber 70 and coming in contact with the spring 80.

This back pressure in the chamber 70 is partially offset by the annular surface of the bottom of the piston 72 which contacts with the sea water in the chamber 62. It is also counterbalanced by whatever pressure exists in the interior of the valve element 30 since this pressure exerts an upward force on the piston rod 40 across the entire cross section of the piston rod which projects below the seal in the upper wall 34.

The preferred embodiment of the invention has been illustrated and described, but changes and modifications can be made and some features can be used in different combinations without departing from the invention as defined in the claims.

What is claimed is:

1. A valve structure for sub-sea well heads and the like including in combination a housing enclosing a valve chamber, poppet valve seats at opposite end portions of the chamber, a valve element having opposite end portions each of which comprises a poppet valve that contacts with one of the respective valve seats when the valve element is moved toward that valve seat, the valve element having a passage therethrough for the flow of fluid through the valve element from one end to the other, a partition intermediate the ends of the chamber dividing the chamber into a pressure section and an exhaust section, a guide bearing in the partition and through which the valve element slides, a seal for the guide bearing separating the sections on opposite sides of the partition from one another, pressure and exhaust ports in the housing communicating with the respective sections of the valve chamber, cylindrical wall surfaces extending from both of the valve seats in the direction of movement of the valve element and surrounding each of the poppet valves closely to prevent flow of fluid past each poppet valve until the poppet valve moves beyond the end of said wall surface, the lengths of the cylindrical wall sections being correlated with the length of the valve element so that the poppet valve that is moving away from its seat reaches the end of its surrounding wall surface at approximately the same time that the poppet valve at the other end of the valve element reaches the beginning of its surrounding wall surface.

2. The valve structure described in claim 1 characterized by a cylinder port at one end of the housing and communicating with the interior of the valve element at a location which is surrounded by the valve seat at the end of the chamber through which said cylinder port opens, the cylinder port being in communication with either of the sections of the valve chamber depending upon which of the valve seats is in contact with the valve element.

3. The valve structure described in claim 2 characterized by the valve element being of different cross section at different locations along its length providing a radially projected surface exposed to pressure in the pressure section of the valve chamber in position to unbalance the valve in a direction to urge the valve element more firmly against the seat that prevents flow from the pressure port to the cylinder port, and a radially projected surface exposed to pressure that urges the valve element into contact with the seat that prevents flow from the cylinder port to the exhaust port.

4. The valve structure described in claim 3 characterized by the valve element being of cylindrical cross section and of different diameters at different locations along the length of the valve element to produce the differences in cross section and the radially projected area.

5. The valve structure described in claim 1 characterized by means for moving the valve element through a stroke substantially longer than the length of said surrounding wall surfaces that prevent interflow through one valve seat to and through the other when the valve element is moving from one seat to the other, the means for moving the valve element including a piston, a pressure chamber in which said piston is located, a sea water chamber at another part of the piston, a spring in the pressure chamber urging the piston to move in a direction opposite to that which the pressure in said pressure chamber urges the piston to move, means sealing the pressure chamber containing the spring from communication with the sea water chamber and the chambers controlled by the valve element.

* * * * *